May 5, 1936.  E. SACKS ET AL  2,039,935
SAFETY DELIVERY CONTAINER
Filed Aug. 7, 1935
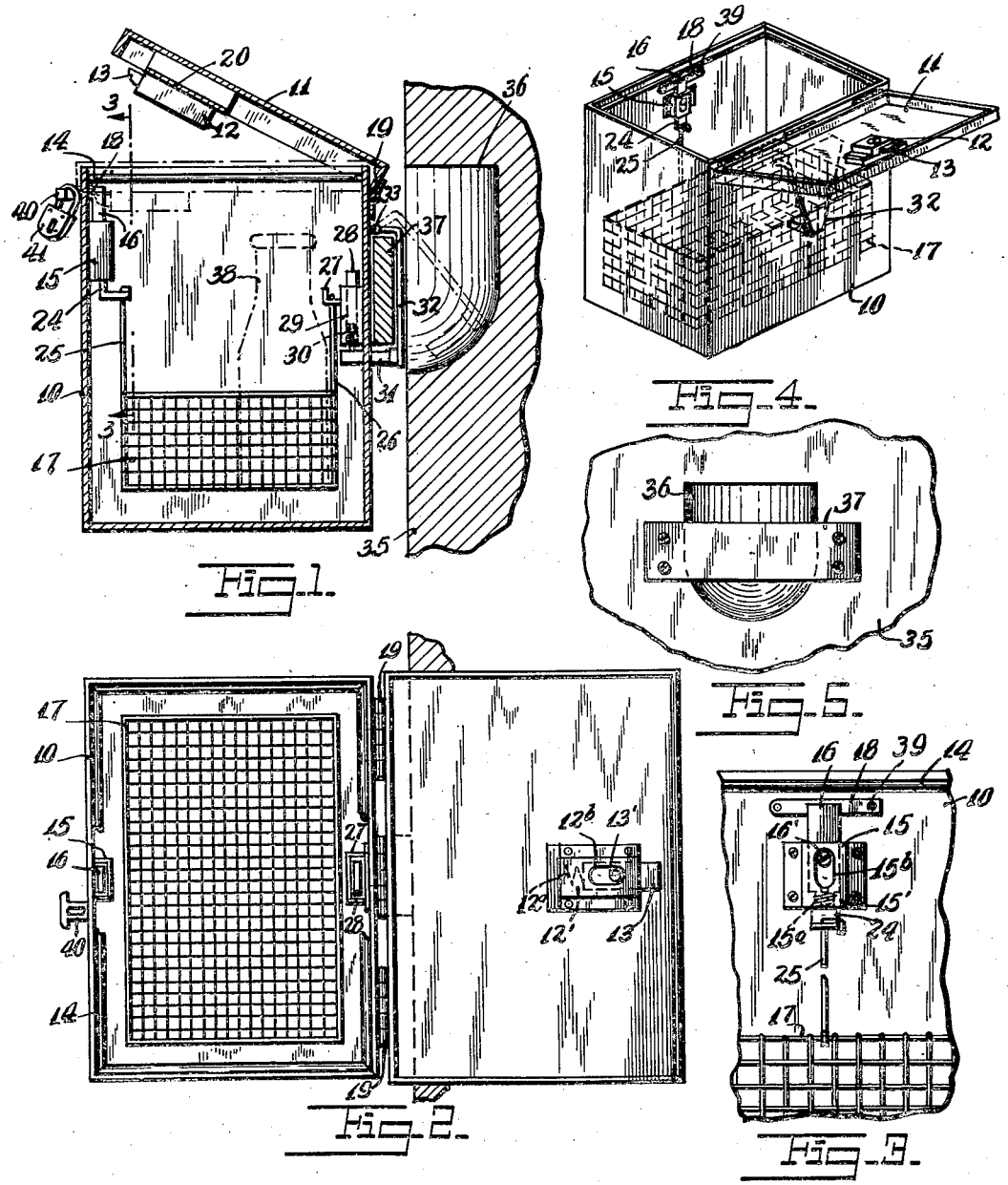
INVENTORS
ELI SACKS
CURT STEINBORN
BY
ATTORNEY Patented May 5, 1936

2,039,935

UNITED STATES PATENT OFFICE 2,039,935

SAFETY DELIVERY CONTAINER

Eli Sacks and Curt Steinborn, Brooklyn, N. Y.

Application August 7, 1935, Serial No. 35,033

9 Claims. (Cl. 232—41)

This invention relates to new and useful improvements in a safety delivery container.

The invention has for an object the construction of a device as mentioned which is characterized by a container body having a hingedly mounted cover, a master latch with a resiliently extended bolt mounted on said cover and engageable with a keeper mounted on the container, and an auxiliary latch mounted on the container, and having a resiliently extended bolt normally preventing said bolt from engaging the keeper, except when moved to an inoperative position by reason of articles being placed within a basket associated therewith.

Still further the invention contemplates the provision of another latch mounted upon the container and adapted to latch an external element by which the container may be locked upon a holding bar or other object.

Another one of the objects of this invention is the provision of a resilient member mounted on the container and normally held fixed by the extended bolt from said auxiliary latch, and when said bolt is retracted, to be moveable to depress the bolt from the first mentioned latch so that the latter may be opened.

Still further the invention proposes the construction of a device as described which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a vertical sectional view of a safety delivery container constructed according to this invention.

Fig. 2 is a plan view of Fig. 1, but showing the door in fully open position.

Fig. 3 is a fragmentary elevational view looking in the direction of the line 3—3 of Fig. 1.

Fig. 4 is a perspective view of the safety delivery container.

Fig. 5 is a front elevational view of an anchorage bar to which the container may be attached.

The safety delivery container, according to this invention, includes a container body 10 having a hingedly mounted cover 11, a master latch 12 with a resiliently extended bolt 13 mounted on said cover and is operative in conjunction with a keeper 14 mounted on the container 10. An auxiliary latch 15 is mounted on the container and has a resiliently extended bolt 16 normally preventing the bolt 13 from engaging the keeper 14. A basket 17 for articles is arranged within the container 10 and is connected with the bolt 16 of the auxiliary latch 15 to retract it when articles are placed in the container. A resilient member 18 is maintained upon the container 10 and normally is held in a fixed position by the extended bolt 16 of the auxiliary latch 15, but when the bolt 16 is retracted, it is movable to move the bolt 13 of the master latch 12 to its open position.

The container body 10 is in the form of a box which has an open top. This open top is closable by the cover 11. The cover 11 is connected upon the body 10 by hinges 19 on one side thereof. The master latch 12 is mounted on a plate 20 which is mounted on the cover 11. The details of the latch 12 will not be given in this specification since latches of this type are generally known. Preferably, such latches comprise a casing 12' from one end of which the bolt 13 projects. This bolt is urged into the extended position by an expansion spring 12ª. A peg 13' from the bolt 13 engages a slot 12ᵇ in the body 12' and limits the extension and retraction of the bolt 13.

The keeper 14 is in the form of a reinforcing rod which is mounted upon the body 10 slightly spaced in from the open edge thereof and extended around all sides. When the cover 11 is closed the bolt 13 is adapted to engage beneath a portion of the keeper rod 14. The auxiliary latch 15 comprises a casing 15' from which the bolt 16 extends. A spring 15ª normally urges the bolt into the extended position. A peg 16' is mounted on the bolt and operates in a slot 15ᵇ in the casing 15' to limit motion of the bolt. The bolt 16 is formed with an extending portion 24 by which it may be retracted. A wire 25 from the basket 17 connects with the portion 24 so that when the basket is weighted the bolt 16 will be moved to the open position.

The basket 17 is also supported by a wire 26 which connects with a finger 27 upon the bolt 28 of another latch 29. This latch comprises a casing upon which the bolt is slidably mounted and a spring 30 within the casing acting in conjunction with the bolt to retract the bolt. The bolt, when extended, moves downward and is engageable in a keeper 31. This keeper extends through the compartment of the body 10 and is mounted upon a bar 32 which is hingedly mounted at the top end 33. The bar 32 is adapted to latch the container on a wall.

Numeral 35 indicates a wall having a recess 36 across which a support bar 37 is mounted. The arrangement is such that the bar 32 may be engaged behind the support bar 37 and then latched in position. The dot and dash lines 38 indicate a bottle of milk within the basket 17. The container is particularly adapted for milk, though other merchandise may of course be placed within it.

The resilient member 18 is fixedly mounted at one end 39, and at the other end has an eye member 40 which extends to the exterior. A lock 41 normally engages the eye member 40 to prevent depression thereof.

The operation of the device is as follows:—
When the basket 17 is empty, the springs 30 and 15a will maintain it in a raised position. In the raised position the latch 29 is open so that the container may be removed from and placed upon the bar 37, at will. Furthermore, in the raised position of the basket 17 the bolt 16 is extended and prevents the bolt 13 from assuming an operative position. Thus, the cover 11 may be closed and opened any number of times without the bolt 13 engaging beneath the keeper 14. When the cover 11 is closed the bolt 13, which has a cam surface at its front end, will be forced inward and maintain a retracted position against the side of the bolt 16.

When the objects are placed within the basket 17 the weight of these objects will move the bolt 28 into operative position to latch the container upon the support bar 37. It now is fixed and cannot be removed. The bolt 16 will be retracted so that when the cover 11 is closed the bolt 13 engages beneath the keeper 14. The device is now locked. To open the device it is necessary that the lock 41 be removed with a key. Then the eye member 40 may be pressed inward to flex the resilient member 18 so that it engages the end of the bolt 13 and pushes the bolt into its retracted position. The cover 11 may then be opened.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:—

1. A safety delivery container, comprising a container body having a hingedly mounted cover, a master latch with a resiliently extended bolt mounted on said cover, a keeper for said bolt mounted on said container, an auxiliary latch mounted on said container and having a resiliently extended bolt normally preventing said bolt engaging said keeper, a basket for articles within said container and connected with the bolt of said auxiliary latch to retract it when articles are placed in the container, and a resilient member mounted on said container and normally held fixed by the extended bolt from said auxiliary latch, and when said bolt is retracted, movable to depress the bolt from said master latch to open the latter.

2. A safety delivery container, comprising a container body having a hingedly mounted cover, a master latch with a resiliently extended bolt mounted on said cover, a keeper for said bolt mounted on said container, an auxiliary latch mounted on said container and having a resiliently extended bolt normally preventing said bolt engaging said keeper, a basket for articles within said container and connected with the bolt of said auxiliary latch to retract it when articles are placed in the container, and a resilient member mounted on said container and normally held fixed by the extended bolt from said auxiliary latch, and when said bolt is retracted, movable to depress the bolt from said master latch to open the latter, said keeper comprising a reinforcing rod attached on the container spaced in from the open edge thereof.

3. A safety delivery container, comprising a container body having a hingedly mounted cover, a master latch with a resiliently extended bolt mounted on said cover, a keeper for said bolt mounted on said container, an auxiliary latch mounted on said container and having a resiliently extended bolt normally preventing said bolt engaging said keeper, a basket for articles within said container and connected with the bolt of said auxiliary latch to retract it when articles are placed in the container, and a resilient member mounted on said container and normally held fixed by the extended bolt from said auxiliary latch, and when said bolt is retracted, movable to depress the bolt from said master latch to open the latter, said resilient member having an eye element extended through the container body, and a lock through said eye element normally preventing flexing of the resilient member to open said bolt.

4. A safety delivery container, comprising a container body having a hingedly mounted cover, a master latch with a resiliently extended bolt mounted on said cover, a keeper for said bolt mounted on said container, an auxiliary latch mounted on said container and having a resiliently extended bolt normally preventing said bolt engaging said keeper, a basket for articles within said container and connected with the bolt of said auxiliary latch to retract it when articles are placed in the container, and a resilient member mounted on said container and normally held fixed by the extended bolt from said auxiliary latch, and when said bolt is retracted, movable to depress the bolt from said master latch to open the latter, said resilient member having an eye element extended through the container body, and a lock through said eye element normally preventing flexing of the resilient member to open said bolt, said resilient member being fixedly mounted at one end and the eye member being mounted on the other end.

5. A safety delivery container, comprising a container body having a hingedly mounted cover, a master latch with a resiliently extended bolt mounted on said cover, a keeper for said bolt mounted on said container, an auxiliary latch mounted on said container and having a resiliently extended bolt normally preventing said bolt engaging said keeper, a basket for articles within said container and connected with the bolt of said auxiliary latch to retract it when articles are placed in the container, a resilient member mounted on said container and normally held fixed by the extended bolt from said auxiliary latch, and when said bolt is retracted, movable to depress the bolt from said master latch to open the latter, and means for locking said resilient element against motion.

6. A safety delivery container, comprising a container body having a hingedly mounted cover, a master latch with a resiliently extended bolt mounted on said cover, a keeper for said bolt mounted on said container, an auxiliary latch mounted on said container and having a resiliently extended bolt normally preventing said bolt engaging said keeper, a basket for articles within said container and connected with the bolt of said auxiliary latch to retract it when articles are placed in the container, a resilient member mounted on said container and normally held fixed by the extended bolt from said auxiliary latch, and when said bolt is retracted, movable to depress the bolt from said master latch to open the latter, and means for locking said resilient element against motion, comprising an eye member thereon extending through said container body, and a lock mounted through said eye member.

7. A safety delivery container, comprising a container body having a hingedly mounted cover, a master latch with a resiliently extended bolt mounted on said cover, a keeper for said bolt mounted on said container, an auxiliary latch mounted on said container and having a resiliently extended bolt normally preventing said bolt engaging said keeper, a basket for articles within said container and connected with the bolt of said auxiliary latch to retract it when articles are placed in the container, a resilient member mounted on said container and normally held fixed by the extended bolt from said auxiliary latch, and when said bolt is retracted, movable to depress the bolt from said master latch to open the latter, and means for attaching said container on a support bar.

8. A safety delivery container, comprising a container body having a hingedly mounted cover, a master latch with a resiliently extended bolt mounted on said cover, a keeper for said bolt mounted on said container, an auxiliary latch mounted on said container and having a resiliently extended bolt normally preventing said bolt engaging said keeper, a basket for articles within said container and connected with the bolt of said auxiliary latch to retract it when articles are placed in the container, a resilient member mounted on said container and normally held fixed by the extended bolt from said auxiliary latch, and when said bolt is retracted, movable to depress the bolt from said master latch to open the latter, and means for attaching said container on a support bar, comprising a hingedly mounted bar on the outside of said container body and having a keeper engageable through the wall of the body to the interior, and a latch upon the interior of the container body adapted to engage said keeper.

9. A safety delivery container, comprising a container body having a hingedly mounted cover, a master latch with a resiliently extended bolt mounted on said cover, a keeper for said bolt mounted on said container, an auxiliary latch mounted on said container and having a resiliently extended bolt normally preventing said bolt engaging said keeper, a basket for articles within said container and connected with the bolt of said auxiliary latch to retract it when articles are placed in the container, a resilient member mounted on said container and normally held fixed by the extended bolt from said auxiliary latch, and when said bolt is retracted, movable to depress the bolt from said master latch to open the latter, and means for attaching said container on a support bar, comprising a hingedly mounted bar on the outside of said container body and having a keeper engageable through the wall of the body to the interior, and a latch upon the interior of the container body adapted to engage said keeper, said latter mentioned latch being operable when articles are placed within said basket.

ELI SACKS.
CURT STEINBORN.